(12) United States Patent
Stanfield

(10) Patent No.: US 6,473,368 B1
(45) Date of Patent: Oct. 29, 2002

(54) CONSUMPTION CONTROLLER

(75) Inventor: James S. Stanfield, Santa Barbara, CA (US)

(73) Assignee: James Stanfield, Santa Barbara, CA (US)

( * ) Notice: Subject to any disclaimer, the term of this patent is extended or adjusted under 35 U.S.C. 154(b) by 0 days.

(21) Appl. No.: 09/523,541

(22) Filed: Mar. 10, 2000

(51) Int. Cl.$^7$ ............................................... G04F 10/00
(52) U.S. Cl. ....................................................... 368/107
(58) Field of Search ...................... 368/10, 89, 107–113

(56) References Cited

U.S. PATENT DOCUMENTS

| | | | |
|---|---|---|---|
| 4,218,611 A | | 8/1980 | Cannon |
| 4,311,448 A | | 1/1982 | Strauss |
| 4,853,854 A | | 8/1989 | Behar et al. |
| 4,862,431 A | | 8/1989 | Drouin |
| 4,914,819 A | | 4/1990 | Ash |
| 4,975,682 A | | 12/1990 | Kerr et al. |
| D319,430 S | | 8/1991 | Cheng |
| D335,460 S | | 5/1993 | Tanaka |
| 5,424,719 A | | 6/1995 | Ravid |
| 5,563,850 A | * | 10/1996 | Hanapole ..................... 368/89 |
| 5,908,301 A | | 6/1999 | Lutz |

* cited by examiner

*Primary Examiner*—Bernard Roskoski
(74) *Attorney, Agent, or Firm*—Leon D. Rosen

(57) ABSTRACT

A portable device helps a person control food consumption to eat in a more relaxed manner so time is provided for the "appestat" in the human brain to signal the person that he/she is full before overeating, and to provide time for conversation when eating with others. The apparatus includes red and green lights (22, 20), a circuit (46) that controls energization of the lights, and a pushbutton switch (42) that operates a portion of a circuit. When the push button (44) is depressed the circuit energizes the red light (22) for a predetermined period such as 30 seconds (which can be varied), to indicate that the person should not eat while the red light is on. After the predetermined period, the circuit energizes the green light (20), to indicate that the person can take one or two bites of food at his/her convenience. As soon as the person takes the one or two bites, the person depresses the push button to cause the red light to be energized for the predetermined period. This cycle continues until the meal is over. When starting the meal, the person turns on the circuit, causing a timer display (24) to begin counting, in seconds and minutes, the time that the device was on. This encourages the person to delay taking bites of food, so the meal lasts at least 20 minutes, and reminds the user to wait until the 20 minute period is over before leaving the eating area or deciding whether to eat another serving.

9 Claims, 2 Drawing Sheets

CONSUMPTION CONTROLLER

BACKGROUND OF THE INVENTION

Research shows that eating too fast has adverse effects for persons who are trying to maintain or lose weight, as well as in discouraging interaction of family members at a dining table. The research shows that it takes approximately 20 minutes from the time we first start eating, for the "appestat", a mechanism in the brain, to signal us that we are full or have had enough to eat. If we eat too fast we consume more food than is necessary before the "appestat" goes off and informs us that we are full. Another consequence of eating too fast, is that it reduces conversation among persons at the table, such as family members. That is, if people leave considerable time between taking bites of food, this provides a more relaxed "social atmosphere" at the dining table. Such a more relaxed atmosphere encourages table conversation. It is noted that in the case of children, studies show that increased conversation at the dining table increases children's reading competency. A device that was easy and comfortable for persons to use, and which slowed the eating process so as to leave more time for the person's brain to signal that he/she is full and to provide a relaxed social atmosphere that encourages social interaction such as conversation at the dining table, would be of value.

SUMMARY OF THE INVENTION

In accordance with one embodiment of the present invention, an apparatus and method are provided for controlling consumption behavior, while also providing a more relaxed dining environment to enhance conversation. The apparatus includes an OK indicator such as a green light that indicates that it is all right to consume, a STOP indicator such as a red light that indicates that it is not permissible to consume, a push button switch, and an electronic circuit. When a person takes one or two bites of food, the person depresses the push button, causing the red light to be energized for a predetermined period on a order of 30 seconds, after which the green light is automatically energized. The green light remains lit while the person decides to take one or two bites of food and then depresses the push button to repeat the cycle. The person has an unlimited period during which the green light is lit, so the person can carry on a conversation and take one or two bites at his/her leisure.

The apparatus includes a timer that displays time in seconds and minutes. When an on-off switch is switched on, the timer begins to show the elapsed time from when the switch was tripped. Starting the timer also energizes the green light, which is switched to red when the push button is depressed. The person is advised to try to extend the eating time to at least 20 minutes. This provides time for the "appestat" in the person's brain to signal the person that he/she is full. This encourages the person to wait until taking a bite of food.

The green and red lights are preferably "LEDs" (light emitting diodes) which are energized from a battery in the portable apparatus. It is preferred that the green light flash on and off slowly, so as to retain the attention of the eater.

The time that the red light is on, when the person should not eat, can be manually adjusted by the user. The user is encouraged to gradually increase the time period when the red light is on, to a period of 20 seconds and preferably longer, provided that the user is comfortable with the period.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
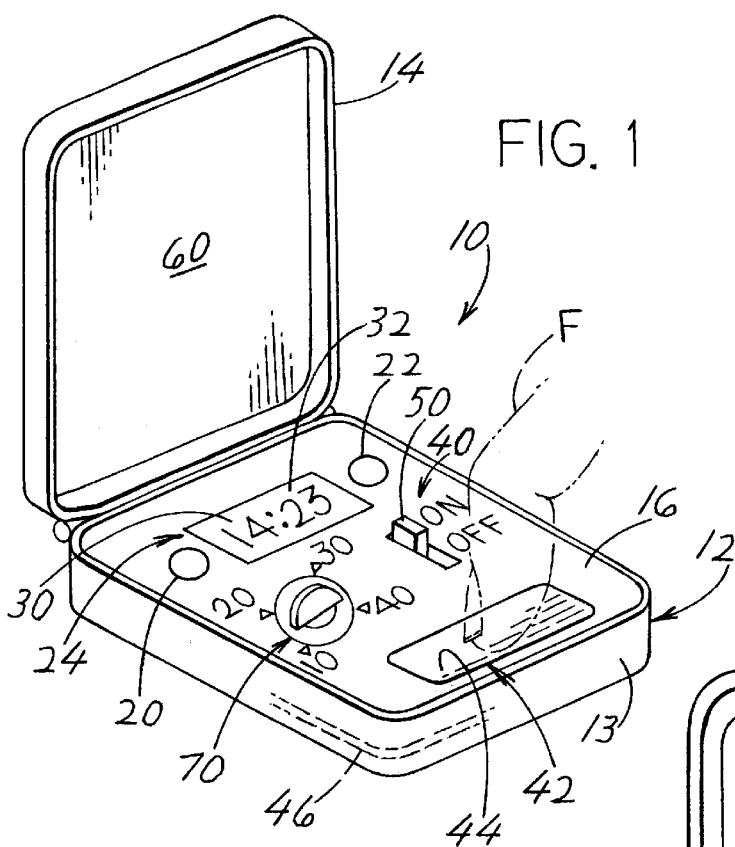
FIG. 1 is an isometric view of a consumption controller apparatus constructed in accordance with the invention, with the cover opened about 90° from a closed position.
Figure 2:
FIG. 2 is a plan view of the apparatus of FIG. 1, with the cover opened about 180° from a closed position.
Figure 2:
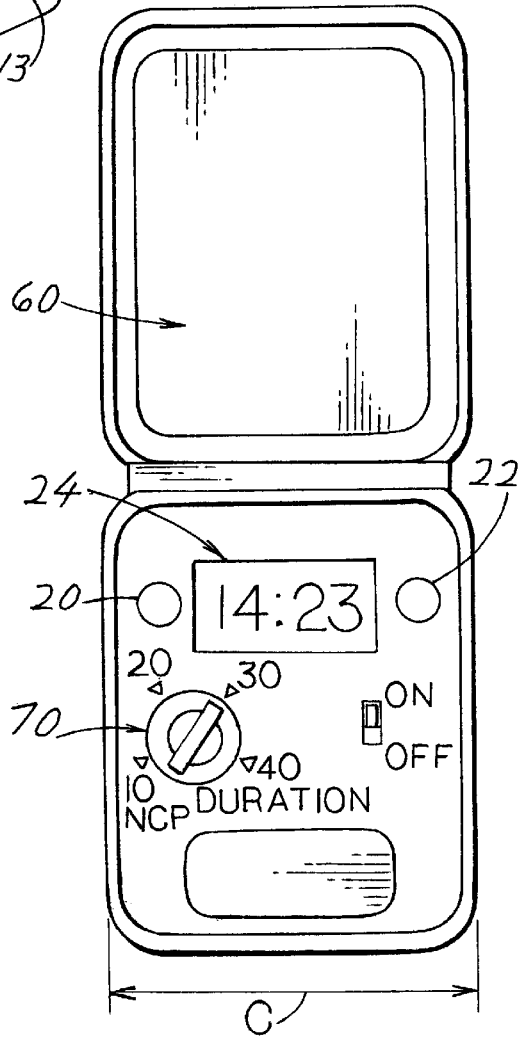
Figure 3:
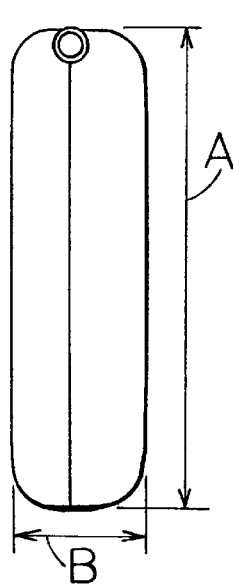
FIG. 3 is a side elevation view of the apparatus of FIG. 1, with the cover fully closed.

FIG. 1 illustrates a portable consumption controller, or device 10 which a person can choose to use to control his consumption behavior. The device includes a frame 12 with a base 13 that contains displays and controls, and a cover 14 that can cover a top surface 16 of the frame. The frame includes a green light 20 in the form of an LED (light emitting diode) that emits a flashing green light, a red light 22 in the form of an LED that emits a steady red light (although it could be made to flash), and a timer display 24 that has a left portion 30 that displays minutes and a right portion 32 that displays seconds. An on-off switch 40 is used to turn on the apparatus. A push button switch 42 has a push button 44 that controls operation of the device, or apparatus. A circuit 46 that includes a circuit board and circuitry thereon connected to the LEDs and display and the switches, lies within the frame.

To activate the apparatus, a person slides a slide actuator 50 of the on-off switch 40. The flashing green light at 20 is then displayed, by the circuit energizing the green LED. The flashing green light continues to be displayed indefinitely, until a person depresses the push button 44 to activate the switch 42. As soon as the push button is depressed, the green light 20 is no longer displayed, but the red light at 22 is displayed by the circuit energizing the red LED. The red light remains on for a predetermined period of time on the order of magnitude of 30 seconds. After that predetermined time period, the red light is automatically deactivated and the flashing green light 20 is automatically activated for an indefinite period until the user is ready to eat again; after a bite or two, the user depresses the push button 44. The finger F of a person is indicated to show the push button being depressed.

The device comes with instructions, which may be printed on the bottom of the base or on the inside of the cover. The instructions remind the operator how the device is to be used. Whenever the green light is on, the person is free to take one or two bites of food (in close succession), but no more. Immediately after the consumption, the person must depress the push button 44, which causes, the red light to light. The person must not consume food so long as the red light is on. However, when the green light comes on again, the person is free to perform the limited consumption (one or two bites), and then must again depress the push button. While the green light is on, the person can wait as long as he/she wishes before consumption (one or two bites).

From the time that the device is activated by moving the slider switch activator 50, the timer display 24 displays the elapsed time. That is, the timer shows the number of seconds and minutes from the time the device was activated and the meal begins. The term "meal" is defined as the food served at the beginning of eating and does not include any second helping or dessert. The instructions advise the person to try to extend the meal to at least 20 minutes. As mentioned earlier, this will provide time for the "appestat" in the brain to signal the person that he/she has had enough to eat. As the person occasionally glances at the timer display 24, the person is encouraged to let the green light remain lit and not take a bite until the person thinks it is appropriate. Thus, the combination of the green light which assures the person he has unlimited time to consume, and the timer that shows the progress the person has made in delaying full meal consumption, helps the person to consume the meal at a more leisurely pace. The leisurely pace, with long periods of green light during which the person can delay a bite as long as he/she wishes, encourages the person to carry on a conversation or other social interaction if the meal occurs in a group.

The STOP period on the order of 30 seconds during which the red light 22 is lit, provides a mandatory period of nonconsumption. Even if the person wishes to eat in a "binge" fashion, the red light orders the person to not eat for at least the predetermined period of perhaps 20 seconds. If the person is in a compulsive state, this helps to bring the person out of that state, especially because the person knows that each STOP period is of limited duration.

The apparatus includes a manual-adjust variable time control 70. This control enables a person to set the predetermined time during which the red light STOP indicator is on. This period may be referred to as non-consumption period indicated by the letters NCP. In the example shown, the control can be set between 10 and 40 seconds. However, the person is instructed to make adjustments only after trying a particular time through several cycles. The goal of the person is to finish the meal at or after 20 minutes have appeared on the timer display.

Although it would be possible to continually energize the green light 20 whenever it is supposed to be on, applicant finds that persons sometimes stop paying attention to the green light and fail to depress the push button 44 when they take one or two bites. To avoid this, applicant flashes the green light 20 on and off, as by turning off the green light for ½ second every two seconds, so the person continues to realize that the green light is on.

Figure 4:
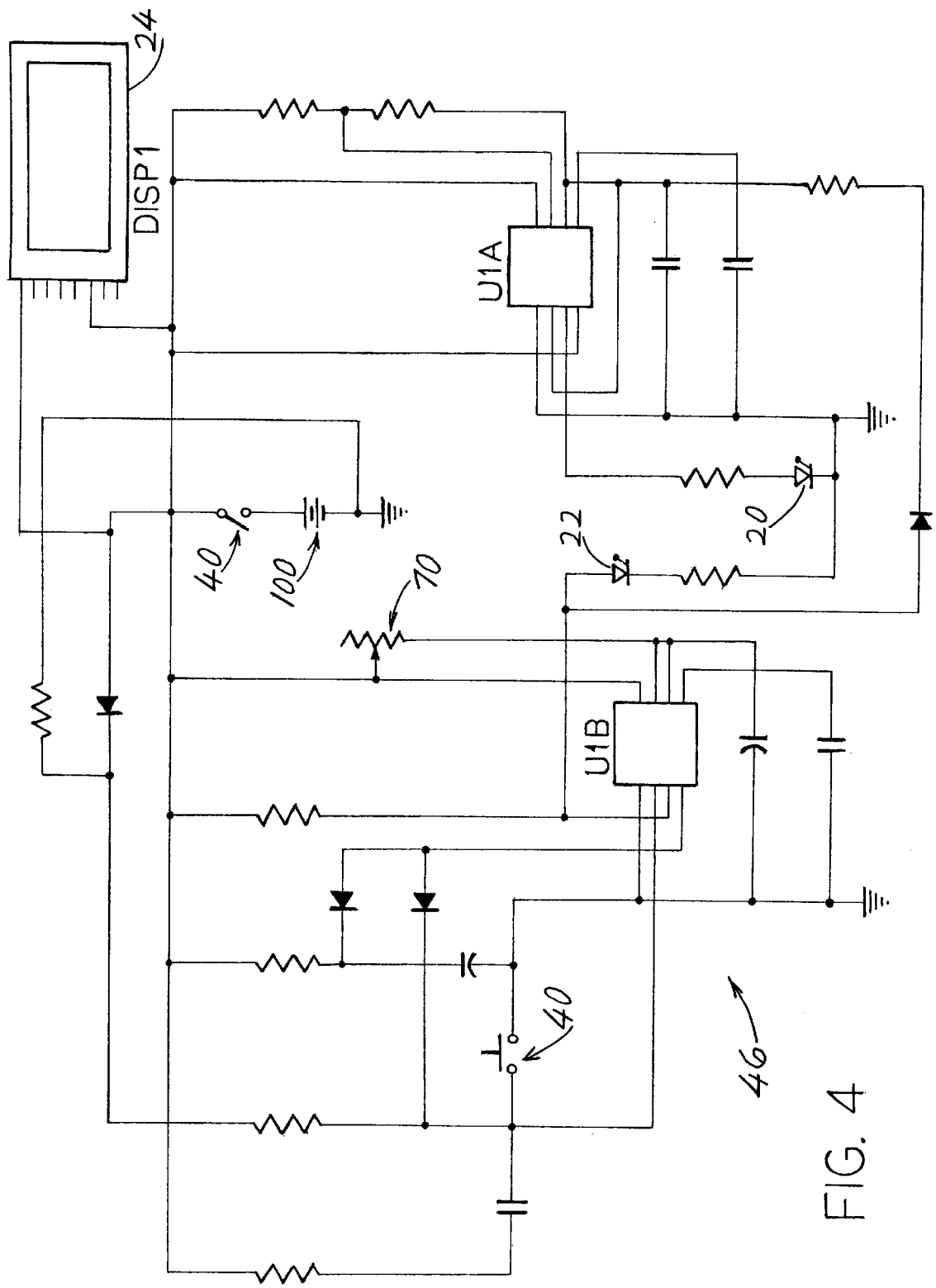
FIG. 4 is a schematic diagram of a circuit of the apparatus of FIG. 1.

FIG. 4 is a schematic diagram of the circuitry 46. The circuitry includes a six volt battery (e.g. a special 6 v battery or four 1.5 V batteries) 100 and other parts labelled according to the parts shown in FIG. 1.

Applicant has constructed and tested a prototype of the apparatus of the type illustrated in FIGS. 1–4. In the compacted configuration, the device has a height A of 2.5 inches, a thickness B of 0.7 inch, and a width C of 2.0 inches. This enables the device to be carried in a pocket until used at a meal.

The control of rate of eating can be useful not only in reducing or maintaining weight, but also to avoid certain medical problems. People who eat too fast tend to swallow air which can cause physical discomfort. Eating too fast can aggravate indigestion. The device for controlling eating can be used to control binge eating, and may even be useful in controlling anorexia. The device has a calming effect that reduces stress.

Although it would be possible to continually energize the green light 20 whenever it is supposed to be on, applicant finds that persons sometimes stop paying attention to the green light and fail to depress the push button 44 when they take one or two bites. To avoid this, applicant flashes the green light 20 on and off, as by turning off the green light for ½ second every two seconds, so the person continues to realize that the green light is on. This results in the green light being on largely continuously.

The presence of an attractive device that has an interesting display, encourages a person to follow the "dictates" of the device. Bright, electrically energized green and red lights, which are commonly associated with "go" and "stop" in traffic lights, help a person surrender behavior to the device. The simple pushbutton switch makes it easy for the person to indicate, to the device, that the person has completed a consumption step. The clear timer display, which starts counting time automatically when the device is put into use, provides instant and convenient feedback as to time passage and encouragement by an official-looking timer (compared to a person timing himself/herself with a watch).

Thus, the invention provides an apparatus for behavior controlled consumption, especially in eating, which is portable and easy to use. The apparatus includes an OK indicator that displays an OK-to-consume indication that is preferably a green light, and a STOP indicator that produces a stop indication that indicates it is not permissible to consume, and that is preferably a red light. A push button switch has a push button that is depressed by the person after each consumption. An electronic circuit turns on the STOP indicator for a predetermined time period whenever the push button is depressed, and after the predetermined time period the circuit controls the displays to display the OK indicator as by illuminating the green light. The apparatus also includes a timer that counts up (it could be constructed to count down) the time when an on-off switch was turned on to begin the sequence.

Although particular embodiments of the invention have been described and illustrated herein, it is recognized that modifications and variations may readily occur to those skilled in the art, and consequently, it is intended that the claims be interpreted to cover such modifications and equivalents.

What is claimed is:

1. Apparatus for behavior controlled consumption comprising:
    a frame;
    an on-off switch, and a pushbutton switch with a push button, each switch being mounted on said frame;
    an OK indicator that displays an OK-to-consume indication that indicates it is permissible to consume, and a STOP indicator that produces a stop indication that indicates that it is not permissible to consume, each indicator mounted on said frame;
    an electronic circuit mounted on said frame and coupled to said switches and to said indicators, said circuit being constructed to energize said OK indicator to display an OK-to-consume indication when said on-off switch is turned on and to continue to display said OK-to-consume indication until said push button is depressed;
    said circuit is constructed so when said pushbutton is operated said circuit energizes said STOP indicator to display a STOP indicator for a predetermined period of time, and at the end of said predetermined period of time said circuit energizes said OK indicator to display said OK-to-consume indication until said push button is again depressed;
    said OK indicator is constructed to display said OK-to-consume indication largely continuously from the end of said predetermined period until said push button is again depressed, and said STOP indicator is constructed to display said STOP indication largely continuously between the time that said pushbutton is operated and the end of said predetermined period.

2. The apparatus described in claim 1 wherein:

said OK indicators comprises a green LED that produces a green light forming said OK to-consume indication, while said STOP indicator comprises a red LED that produces a red light forming said stop indication.

3. The apparatus described in claim 2 wherein:

said circuit is constructed to flash said green LED on and off when said circuit energizes said OK indicator.

4. The apparatus described in claim 1 including:

a timer with a timer display mounted on said frame, which displays time in seconds and minutes, said circuit including a clock portion that is coupled to said on-off switch and that drives said timer display to display a time count in seconds and minutes, that begins when said on-off switch is switched on.

5. Apparatus for behavior controlled consumption comprising:

a frame;

a pushbutton switch mounted on said frame, and having a push button that can be depressed;

a red light indicator that displays a red light when energized and a green light indicator that displays a green light when energized, each indicator being mounted on said frame;

a battery-energized electronic circuit mounted on said frame and switch and coupled to said switch and to said indicators;

said circuit being constructed to energize said green light indicator to display said green light largely continuously until said push button is depressed, and upon depression of said push button to energize said red light indicator to display said red light largely continuously for a predetermined time period on the order of magnitude of 30 seconds and to thereafter automatically energize said green light indicator to display said green light until said push button is depressed.

6. The apparatus described in claim 5, including:

a timer display mounted on said frame and having second and minute displays;

an on-off switch mounted on said frame;

said electronic circuit includes a clock circuit part that is coupled to said on-off switch and that energizes said timer display to show the time elapsed since the on-off switch was turned on.

7. The apparatus described in claim 5 wherein:

said green light indicator includes an LED that produces green light, and said circuit is constructed to repeatedly energize and deenergize said LED between the end of said predetermined time period and depression of said push button to provide a flashing green light.

8. A method for behavior-controlled eating, comprising:

displaying an OK-to-eat indication while a person takes no more than a predetermined number of bites of food;

depressing a push button by said person, and displaying a STOP indication that indicates that the person should not eat, continuing to display said STOP indication for a predetermined period of time that is on the order of magnitude of 30 seconds, and then automatically displaying said OK-to-eat indication until said person depresses said push button, so steps of displaying an OK-to-eat indication and steps of depressing a push button and displaying a STOP indication, alternate;

said steps of displaying said OK-to-eat indication including displaying a light immediately after said predetermined period of time and a plurality of seconds later if the person has not yet depressed said push button.

9. The method described in claim 8 including:

initially turning on a display to perform a first of said steps of displaying an OK-to-eat indication;

energizing a timer to display a time period in seconds and minutes that continually advances, and that begins upon performing said step of initially turning on a display.

* * * * *